United States Patent [19]

Anderson et al.

[11] Patent Number: 4,625,735
[45] Date of Patent: Dec. 2, 1986

[54] HUSKING ROLL ASSEMBLY WITH CUTTER ELEMENT

[76] Inventors: Ronald L. Anderson, 3641 Agate St.; Harry T. Kessler, Jr., 4460 Mill, both of Eugene, Oreg. 97405

[21] Appl. No.: 689,095

[22] Filed: Jan. 7, 1985

[51] Int. Cl.$^4$ ............................................. A01D 45/02
[52] U.S. Cl. ................................... 130/5 G; 130/5 J; 56/104; 56/110; 56/117
[58] Field of Search ............... 130/4, 5; 56/14.1, 14.2, 56/64, 104, 110, 117

[56] References Cited

U.S. PATENT DOCUMENTS

| | | | |
|---|---|---|---|
| 135,841 | 2/1873 | Philip | 130/5 G |
| 856,828 | 6/1907 | Wilson | 130/5 G |
| 902,729 | 11/1908 | Hibbs | 130/5 G |
| 2,239,899 | 5/1941 | Nightenhelser | 130/5 D |
| 2,589,841 | 3/1952 | Miller | 56/104 |
| 2,704,078 | 3/1955 | Scranton | 56/104 |
| 3,001,527 | 9/1961 | Jones | 56/104 |
| 3,101,720 | 8/1963 | Karlsson | 130/5 C |
| 3,103,240 | 9/1963 | Minera | 130/5 D |

FOREIGN PATENT DOCUMENTS 602926  8/1960  Canada .................................. 56/104

*Primary Examiner*—Robert Peshock
*Assistant Examiner*—John G. Weiss
*Attorney, Agent, or Firm*—James D. Givnan, Jr.

[57] ABSTRACT

A roll assembly for a husking machine of the type using cooperating roll assemblies to exert a husking or stripping action on a food article being processed. A cutter element is carried in a recessed manner within aligned recesses in roll segment lands. The cutter element may be detachable or cast in place within the roll segment. The roll segments may be of resilient or non-resilient material with their cooperating roll segments being of like or unlike material.

12 Claims, 9 Drawing Figures

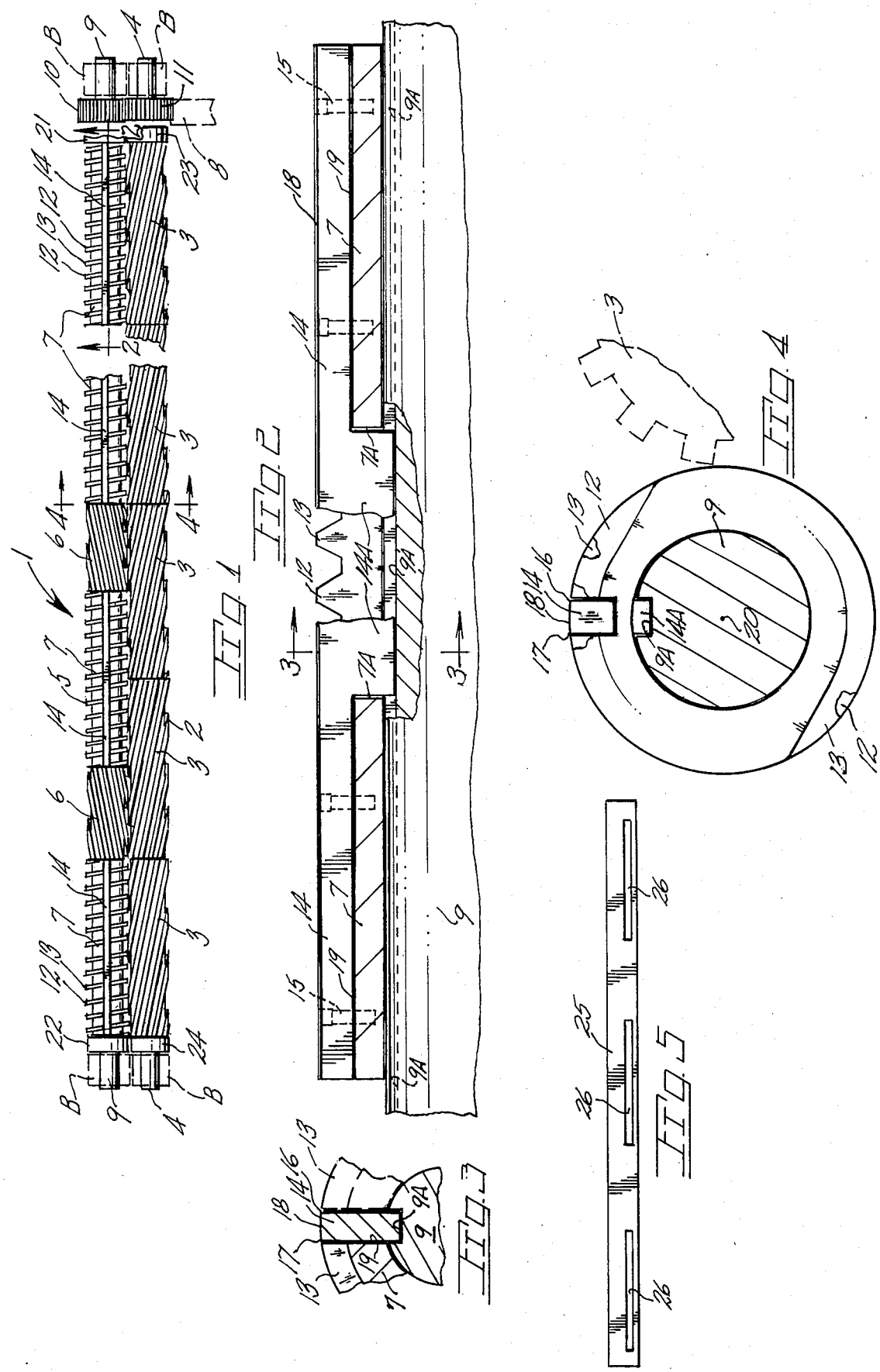

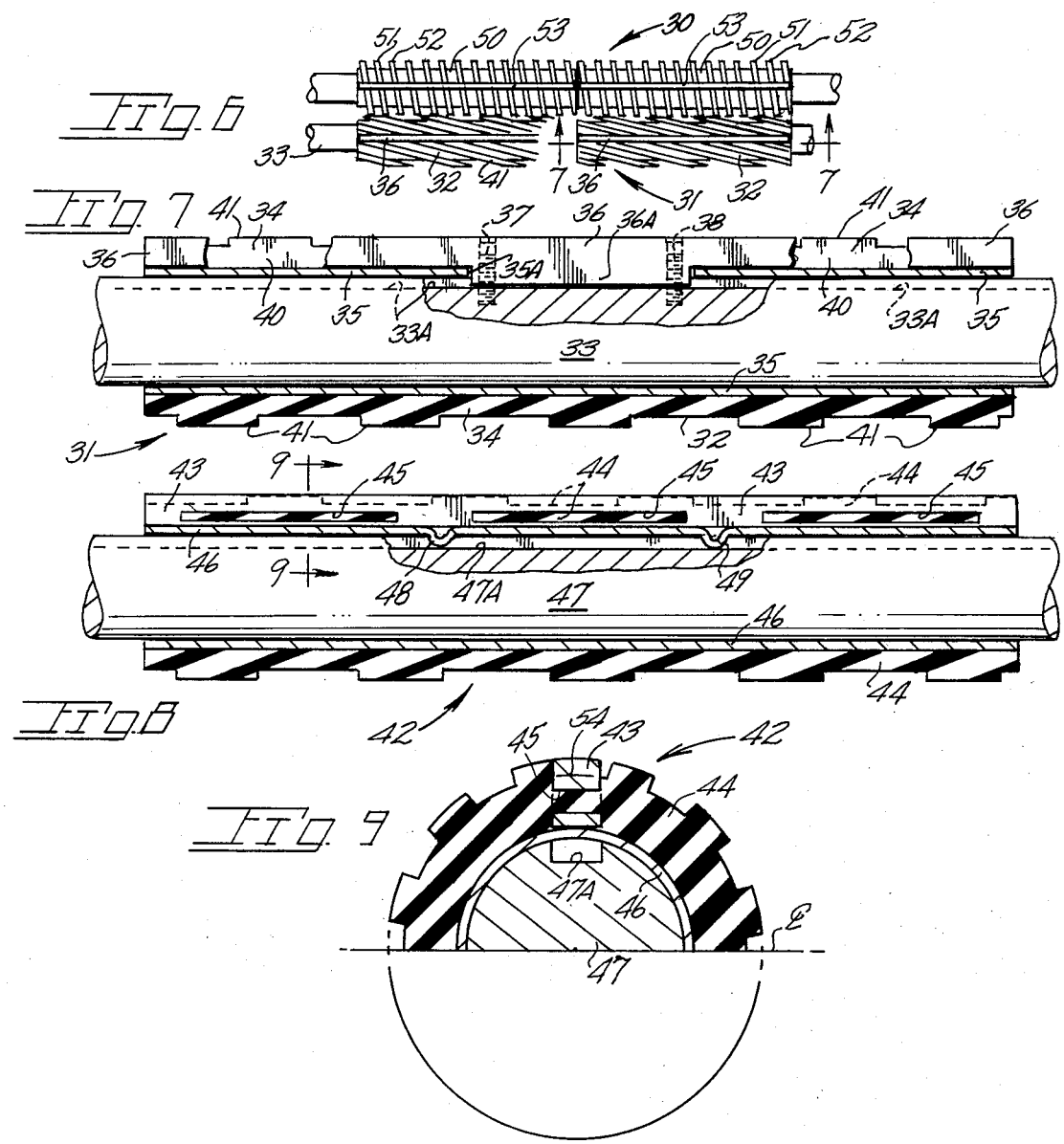

HUSKING ROLL ASSEMBLY WITH CUTTER ELEMENT

BACKGROUND OF THE INVENTION

The present invention pertains generally to husking rolls of the type used in corn husking machines in food processing plants.

Corn husking machines utilize cooperating pairs of rolls of grooved, resilient material which counter rotate to provide a bite area to exert a stripping action on the husk of an ear. The rolls jointly propel the stripped ears of corn therealong to a discharge point with the husks being discharged downwardly between the rolls. Such a resilient roll arrangement functions satisfactorily in the processing of most types of sweet corn which has a higher moisture content and is less susceptible to damage than hybrid or seed corn. Subjecting ears of the latter types of corn to the above described aggressive roll configuration results in not only husk removal but also the undesired partial shelling of kernels from the ear to render sweet corn husking machines impractical for husking seed corn or other fragile food articles. Some species of sweet corn are also susceptible to damage and partial shelling by conventional husking rolls.

Previous attempts in the corn processing industry to vary the stripping action of resilient rolls has included the use of paired resilient and non-resilient rolls of like and unlike configuration such as are found in U.S. Pat. Nos. 2,610,634 and 2,180,594. Further the art discloses in U.S. Pat. No. 3,101,720 a husking roll having metal surfaces which coact with a resilient surface of a companion roll for the purpose of releasing an ear held upright between the rolls. U.S. Pat. Nos. 2,239,899 and 2,180,594 show a roll with metal and rubber segments on a common shaft. Accordingly it is known in the prior art to use rolls of differing resiliencies and external configurations to husk an ear of corn. Further, U.S. Pat. Nos. 3,103,240 and 3,325,878 disclose rolls for processing food articles with metallic and rubber roll components in a single roll member.

SUMMARY OF THE PRESENT INVENTION

The present invention is embodied within a roll arrangement for use in a husking machine wherein a husk cutting action is desired to avoid damage to the articles being processed.

In one form of the present roll assembly a roll segment has non-resilient helical lands which both advance the ears along the rolls while exerting a less aggressive stripping action than would be the case using a pair of resilient rolls as is a common practice. Any trapping of an ear end or stalk fragment is an upright position in a helical groove of the roll segment is prevented in the present roll assembly by a cutter element on the roll periphery which severs the trapped stalk fragment. Such upended ears or stalks if left upright result in excessive resilient roll wear and eventually incomplete husking.

One present roll arrangement incorporates a roll segment having lands which exert a reduced degree of stripping action on an ear of seed corn or other fragile food article. Accordingly the ear is husked without shelling of the kernels to permit delivery of the intact ear to a subsequent operation. To prevent the upending of an ear and/or attached stalk segment, a lengthwise disposed cutter element on a roll segment severs the ear end or stalk segment permitting the ear to fall back on to the rolls and be subjected to roll husking action.

A present roll assembly includes roll segments having lands and grooves with a cutter element disposed along the roll periphery. The cutter element includes a cutting edge which rotates with the roll segment in a path common to the roll periphery. The cutter element may be cast in place within the roll segment or alternatively removably mounted on said segment.

Important objectives of the present husking machine roll assembly include the provision of a roll assembly having both resilient and non-resilient roll segments which subject the ear husk to different degrees of aggressiveness of stripping action as it moves along cooperating roll assemblies and also to a cutting action to accomplish husking without undesired kernel damage or separation from the ear; the provision of a husking machine roll assembly having lands with a recessed cutter element on the roll periphery which cuts any stalk accidently displaced to the upright position during husking; the provision of a husking roll segment which contributes to resilient roll life by preventing the tipping of ears and associated stalk sections to the upright and trapping same between lands; the provision of a cutter element in a roll segment which element may be reoriented on the roll segment to expose a "new" cutting edge; the provision of a cutter element which also serves to key the roll segment to a supporting shaft.

BRIEF DESCRIPTION OF THE DRAWING

In the accompanying drawing:

FIG. 1 is a plan view of cooperating rolls removed from a husking machine.

FIG. 2 is a sectional view of a roll segment taken along line 2—2 of FIG. 1;

FIG. 3 is a vertical sectional view taken along line 3—3 of FIG. 2;

FIG. 4 is a vertical sectional view taken along line 4—4 of FIG. 1;

FIG. 5 is a side elevational view of a modified cutter element;

FIG. 6 is a fragmentary plan view of a modified roll assembly wherein a cutter element is in place in a resilient roll;

FIG. 7 is a sectional view taken along line 7—7 of FIG. 6;

FIG. 8 is a view similar to FIG. 7 but showing a further modified roll segment; and FIG. 9 is a vertical sectional view taken along line 9—9 of FIG. 8.

DETAILED DESCRIPTION OF THE PREFERRED EMBODIMENT

With continuing attention to the drawing wherein applied reference numerals indicate parts similarly hereinafter identified, the reference numeral 1 indicates generally cooperating husking roll assemblies removed from a machine and which counter rotate to jointly act on the article being processed to remove extraneous matter.

A first roll assembly 2 may be comprised of tubular, resilient roll segments 3 in place on a common shaft 4 having spiral grooves in the usual manner.

A cooperating or second roll assembly at 5 is disposed in parallel to roll 2 and includes resilient and non-resilient roll segments indicated respectively at 6 and 7 in place on a shaft 9. The roll assemblies 2 and 5 are adapted for counter rotation by a power source imparting motion such as by means of a driving gear 8 and enmeshed gears 10 and 11. The roll shafts 4 and 9 are journalled within bearings B. A husking machine with such a roll mounting and drive arrangement is disclosed in U.S. Pat. No. 4,278,097 issued to the present inventors.

With attention now to novel roll assembly 5 the same, as aforementioned, includes both resilient and non-resilient tubular segments at 6 and 7 which also differ in their external configuration. The resilient roll segments 6 are grooved in a similar manner to roll segments 3 or roll assembly 2 and cooperate therewith to exert an aggressive stripping action of an ear being processed.

Roll segments 7 of roll assembly 5 may be of cast metal or other non-resilient material with twin helical lands at 12 and 13 which exert, along with roll 2, a reduced or less aggressive stripping action on a husk of an ear being processed. The top (viewed) portion of the roll segments 7 rotate toward a central bit area and by their helical nature and inclination advance the ears from right to left as viewed in FIG. 1 with the ears being deposited at the right hand ends of the two roll assemblies Roll segments 7 include a cutter element 14 which coacts with a peripheral land surface of a cooperating roll segment 3 to sever stalk and husk fragments trapped between lands 12 and 13. Accordingly damage by abrasion to the resilient roll segments 3 by an upright trapped stalk segment is avoided thus adding to roll life and effectiveness.

A preferred embodiment of the present roll assembly includes segments 7 with the cutter element 14 having a centrally located ear 14A which passes radially through a roll segment opening 7A and seats within a keyway or groove 9A in roll assembly shaft 9. Cutting edges are at 16 and 17 in FIG. 3. Elongate opening 7A is machined or cast within the roll to receive the cutter element ear 14A. Accordingly, ear 14A may serve as a key for driving the roll segment while permitting periodic, lengthwise removal of the roll segments from shaft 9 for maintenance purposes. Retention means such as machine screws 15 removably attach the cutter element in a roll segment channel 19 and permit replacement of the cutter element or remounting thereof after being turned end-for-end for the purpose of utilizing a second cutting edge 16 or 17 which heretofore was the cutter element trailing edge. The cutter element 14 may be of stainless steel or other hard metal. The outer surface 18 of the cutter element should be radiused and concentric with the roll segment center 20. Channel 18 extends jointly through lands 12 and 13.

Internally threaded rings at 21, 22, 23 and 24 on threaded portions of shafts 4 and 9 confine the roll segments in place.

The resilient roll segments 6 may be constructed as disclosed in our earlier noted U.S. patent; i.e., with a tubular metal core in key-like engagement with keyway groove 9A.

During assembly of roll assembly 5 the roll segments 6 and 7 are slid onto shaft 9 in the number and sequence to achieve desired aggressiveness of the cooperating roll assemblies. The sequence and number of roll segments shown in FIG. 1 is intended to be only typical as resilient and non-resilient roll segments may be varied to best suit the food article being husked.

In a modified cutter element 25 shown in FIG. 5, the same may be cast in place in the roll segment with the cutter element being permanently secured in place by means of an insert casting technique with a flow of molten material entering voids 26 in the cutter elements to provide retention means.

The present roll arrangement may be readily applied to existing husking machines to modify same for processing seed corn or other food articles where less aggressive roll action is desirable to minimize article damage and waste.

A modified roll segment is shown in FIG. 6 and 7 wherein fragments of cooperating roll assemblies are indicated generally at 30 and 31. Tubular roll segments at 32 are carried by a common shaft 33 and have resilient outer members 34 each molded in place on a sleeve 35. A cutter element 36 extends the length of the roll segment with a cutter element ear 36A passing inwardly through a sleeve defined slot or opening 35A and seating within a shaft groove or keyway 33A. Fasteners 37-38 serve as retention means to hold cutter element 36 in place in a detachable manner on the shaft. In this form of the invention the roll segment is molded with a lengthwise channel 40 to receive the cutter element. The outer member has a spiral grooved exterior with the grooves defined by lands 41.

In the further modified resilient roll segment generally at 42 in FIGS. 8 and 9 a cutter element 43 is joined with the roll resilient outer member 44 by reason of open areas 45 in the cutter element being occupied by a flow of material entering the voids of the open areas during molding of the roll segment to a sleeve 46. For "keying" the roll sleeve 46 to the shaft 47 the sleeve may be dimpled at 48 and 49 which dimples seat within shaft keyway 47A.

With attention back to FIG. 6, non-resilient roll segments at 50 have twin helical lands at 51-52 which cooperate with the resilient outer members of roll segments 32 to husk the article. An anvil at 53 on each roll segment 50 has an outer surface which is located so as to meet with the cutter elements 36 on the companion roll to effect a severing of vegetable matter coming into the bite area. In the case where the cooperating roll segments are of like external configuration and are in mesh with one another the outermost surface of the cutter element would have to be recessed somewhat as indicated at 54 in FIG. 9 so as to not interfere with roll segment meshing.

While we have shown but a few embodiments of the invention, it will be apparent to those skilled in the art that the invention may be embodied still otherwise without departing from the spirit and scope of the invention.

Having thus described the invention, what is desired to be secured in a Letters Patent is:

1. A husking roll assembly for use in a husking machine and comprising in combination,
    a shaft adapted at its ends for journalled support within the husking machine, said shaft defining a keyway, and
    tubular roll segments on said shaft and having lands thereon, said lands jointly defining a recess, a cutter element inset within said recess and having an outer surface terminating laterally in edges located at or proximate the roll segment periphery, said cutter element having an inwardly projecting ear thereon for inserted engagement with said shaft defined keyway.

2. The husking roll assembly claimed in claim 1 wherein the lands on the roll segments are twin helical lands.

3. The husking roll assembly claimed in claim 1 wherein said cutter element edges are leading and trailing edges with respect to roll rotation, fasteners retaining the cutter element in a removable manner on the roll segment to permit removal and reinstallation of the cutter element turned end-for-end on a tubular roll segment whereby said leading and trailing edges may be reversed.

4. The husking roll assembly claimed in claim 3 wherein each of said roll segments defines an elongate opening, said cutter element ear disposed within said opening.

5. The husking roll assembly claimed in claim 1 wherein said tubular roll segments are of non-resilient material, said roll assembly additionally including resilient tubular roll segments each interposed on said shaft between two of said tubular roll segments of non-resilient material, the number of resilient tubular roll segments being directly proportional to degree of roll assembly aggressiveness.

6. The husking roll assembly claimed in claim 1 wherein said roll segments and said cutter element thereon are of non-resilient material.

7. The husking roll assembly claimed in claim 1 wherein said roll segments each include a sleeve, an outer member of resilient material on said sleeve, said lands formed from said resilient material.

8. The husking roll assembly claimed in claim 7 additionally including fasteners recessed within and retaining the cutter element in a removable manner on the roll segment to permit removal and replacement of the cutter element turned end-for-end on a tubular roll segment whereby leading and trailing edges may be reversed.

9. In a machine for removing the husk from an article of food, said machine having cooperating powered roll assemblies exerting a stripping action on the food article, the improvement comprising at least one of said roll assemblies having a roll segment, a cutter element including a cutting edge located on the roll segment periphery, said cutter element defining voids, said roll segment having lands jointly defining a recess in which said cutter element is carried, retention means comprising roll segment material occupying said voids and serving to retain said cutter element in place.

10. In a machine for removing the husk from an article of food, said machine having cooperating powered roll assemblies exerting a stripping action on the food article, the improvement comprising roll segments in each of said roll assemblies, some of said roll segments including a cutter element having its outermost surface uniformly inset from the roll assembly periphery other of said roll segments having a cutter element with its outermost surface flush with the roll segment periphery, said roll segments each having lands jointly defining a recess in which said cutter element is carried, retention means serving to retain said cutter element in place.

11. The improvement claimed in claim 10 wherein said cutter element defines voids, said retention means comprising roll segment material entering the voids during roll segment formation.

12. In a husking machine for food articles having a first roll assembly and a second roll assembly and means driving said first roll assembly and said second roll assembly in a counterrotating manner to jointly act on a food article moving therealong, the improvement comprising said first roll assembly comprised of resilient roll segments each having helical lands thereon, said second roll assembly comprised of both non-resilient and resilient roll segments both having helical lands thereon but of different configuration to exert different degrees of husking action as the article moves lengthwise along the first and second roll assemblies, said resilient roll segments of the second roll assembly being interposed between non-resilient segments of the second roll assembly, at least some of said non-resilient roll segments of the second roll assembly having a cutter element lengthwise disposed on the roll segment periphery.

* * * * *